Figure 1:
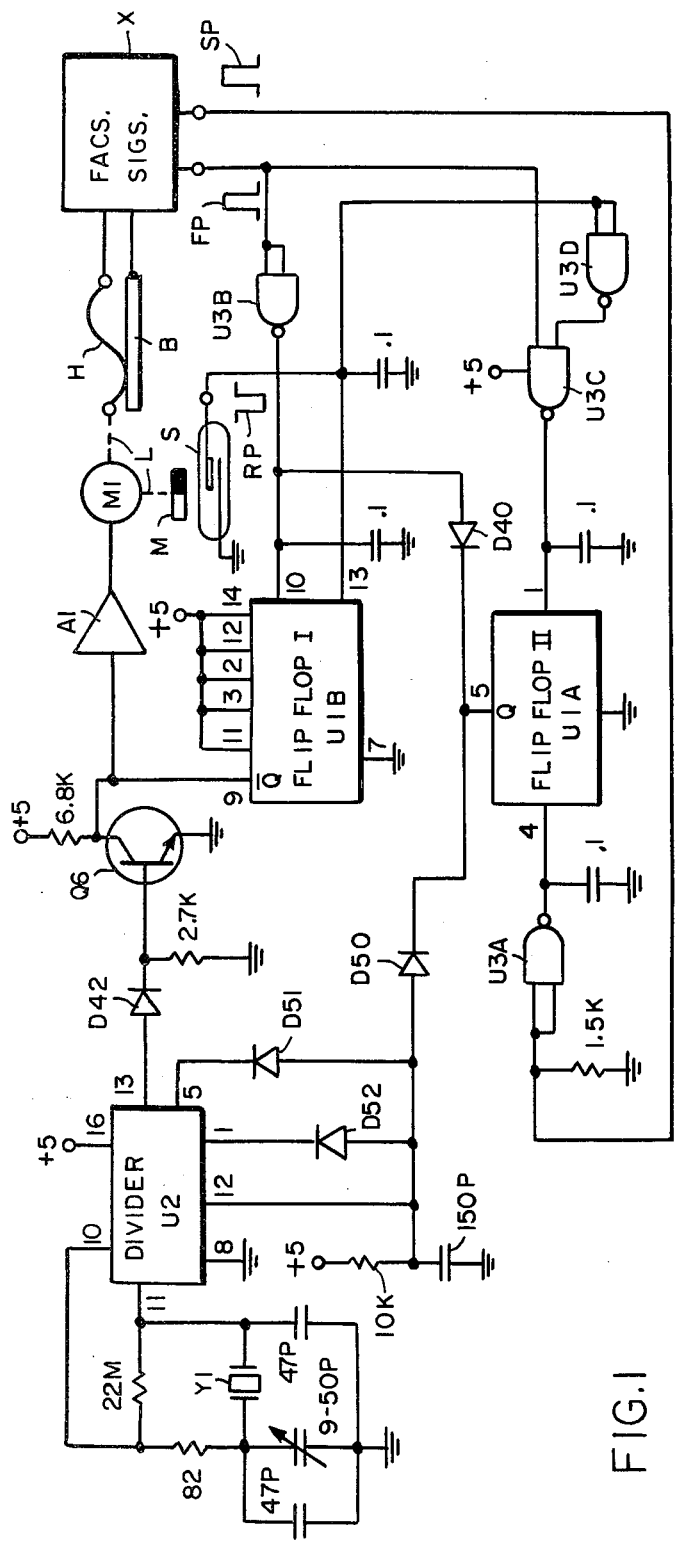

United States Patent [19]

Vano

[11] 4,262,310

[45] Apr. 14, 1981

[54] FACSIMILE RECORDER FRAMING CIRCUIT

[75] Inventor: Gerald L. Vano, Brockton, Mass.

[73] Assignee: Alden Research Foundation, Westboro, Mass.

[21] Appl. No.: 37,443

[22] Filed: May 9, 1979

[51] Int. Cl.³ .............................................. H04N 1/36
[52] U.S. Cl. ...................................... 358/277; 318/85
[58] Field of Search ............... 358/267, 268, 275, 276, 358/277; 361/243; 318/85

[56] References Cited

U.S. PATENT DOCUMENTS

| | | | |
|---|---|---|---|
| 3,401,321 | 9/1968 | Miki | 318/85 |
| 3,408,547 | 10/1968 | Saeger | 318/85 |
| 3,408,549 | 10/1968 | Shimbukuro | 318/85 |
| 3,430,148 | 2/1969 | Miki | 318/85 |
| 3,582,550 | 6/1971 | Latanzi | 358/275 |
| 3,670,105 | 6/1972 | Houck | 358/277 |
| 3,934,182 | 1/1976 | Donohue et al. | 318/65 |

*Primary Examiner*—Joseph A. Orsino, Jr.
*Attorney, Agent, or Firm*—James H. Grover

[57] ABSTRACT

A facsimile recorder has a motor driving a scanning element and also generating recorder pulses occurring proportionally to the recorder scanning speed. A circuit for synchronizing the scanning motor with incoming framing pulses of a facsimile signal comprises a first dual data type flip flop with a first output, a first input receiving the framing pulses and a second input receiving the recorder pulses. The flip flop produces a gating pulse of duration corresponding to the interval between asynchronous occurrence of framing and recorder pulses which causes transmission of power to the recorder motor during the asynchronous interval. Consequently the motor speed and hence the period of the recorder pulses are varied in proportion to asynchronism until the framing and recorder pulses are coincident when the motor is synchronous with the framing pulses.

Power is transmitted to the recorder motor at a particular frequency derived from a frequency standard. In addition to varying the time the power is transmitted the frequency of the power and hence the speed of the motor is varied by a second flip flop so as to reduce the time needed to bring the motor into synchronism with the received framing pulses.

11 Claims, 2 Drawing Figures

FACSIMILE RECORDER FRAMING CIRCUIT

BACKGROUND OF THE INVENTION

When facsimile signals representing graphic information are received at a recorder they contain in addition to the graphic information a signal to the recorder to start scanning line by line across electrosensitive recording paper, and also a series of framing pulses signalling the beginning of each incoming line of information to be recorded. A scanning motor drives a scanning belt carrying masking styli or a drum having a helix curved around it for scanning successive lines of the recording paper. For undistorted recording of each line of the incoming graphic information signal it is essential that each line scan of the paper be synchronous, in phase, with the receipt of the incoming line of graphic information. At the beginning of each graphic information signal is the aforementioned framing pulse. The recorder generates a corresponding pulse at the start of each scan line. For example, as a scanning helix is revolved by the recorder motor a reed switch is actuated at the beginning of each helix line scan so as to generate a recorder pulse. The recorder is synchronized with the incoming signal by comparing the time of occurrence of the recorder pulse and the framing pulse. As shown, for example, in U.S. Pat. No. 2,686,832 the recorder motor is then controlled until the recorder pulse is synchronous with the framing pulse.

The object of the present invention is to provide an improved motor control circuit which more rapidly achieves synchronism, particularly with motors of small torque output.

STATEMENT OF INVENTION

The invention concerns an electronic circuit for synchronizing a facsimile recorder scanning motor with the periodic framing pulses of an incoming facsimile signal, said motor generating periodic recorder pulses proportional to the recorder speed, the circuit comprising a channel for supplying power to the motor, a comparison circuit having an output and inputs respectively receiving the framing and recorder pulses and including means for sensing the deviation from synchronism of the framing and recorder pulses and producing at said output control pulses related in duration to said deviation, and means connected in the power channel and responsive to the control pulses to transmit power noncontinuously to the motor for the duration of the control pulses; whereby the motor speed and period of the recorder pulses are adjusted in relation to asynchronism of the framing and recorder pulses until the pulses are coincident and the recorder is synchronous with the incoming framing pulses.

More particularly the power channel comprises an alternating current power source such as an oscillator and the comparison circuit includes an output connected to the power source for varying the frequency of the source as well as controlling transmission of power from the source.

DRAWING

Figure 2:
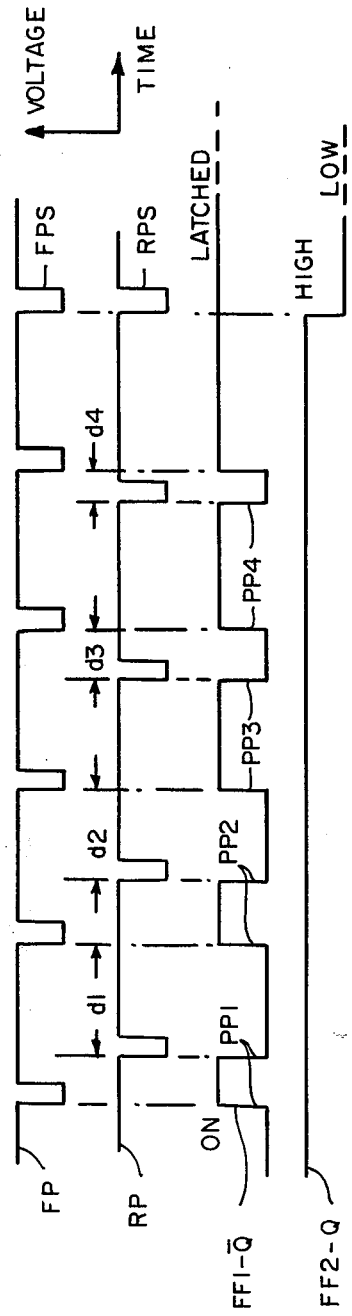

FIG. 1 is a schematic diagram of a facsimile recorder having a synchronizing circuit according to the invention; and FIG. 2 is a graph of voltages in the synchronizing circuit plotted versus time.

DESCRIPTION

Shown schematically at the upper right corner of FIG. 1 is a facsimile recorder of signals from a facsimile signal source X. As shown the source delivers three signals, a positive going start pulse SP occurring just before graphic information signals are received, a positive going framing pulse FP occurring at the beginning of each line of received graphic information, and graphic signals not shown but applied to a conventional helical scanning electrode H and a blade electrode B which mask a recording web between them. The helical electrode H is driven by a motor M1 which receives alternating current of selected frequency from a power channel consisting of a crystal oscillator frequency standard Y1, a frequency divider U2, a transistor Q6 and a power amplifier A1. The motor M1 by the same mechanical linkage L which drives the helix also rotates a magnet M causing a reed switch S to close briefly just prior to the beginning of each scan of the helix thereby generating a negative going recorder pulse RP. The framing pulse FP output of the facsimile signal source X is connected through gate U3B (connected as an inverter) to the input 10 of flip flop I. The reed switch S is connected to flip flop I input 13.

The synchronizing circuit of the present invention comprises flip flops I and II of a dual, data type flip flop integrated circuit type SN7474N fed by four nand gates of a quad NAND gate integrated circuit type SN15846N. The start pulse SP is derived from the termination of a few seconds of tone modulation transmitted and received just prior to the transmission and receipt of graphic information facsimile signals. The start pulse occurs only once per frame of graphic information and serves to preset the two sections U1A and U1B of flip flops I and II. The start pulse SP output of the facsimile signal source is applied through gate U3A (connected as an inverter) to the reset input 4 of flip flop II U1A. The start pulse sets the output Q (U1A-5) of flip flop II high so that (1) terminal 12 of the frequency divider U2 is held high and the divider divides the crystal frequency to a relatively low motor drive repetition rate or speed as will be explained more fully; and (2) the first input 10 of flip flop I is also set high.

Setting the flip flop I first input high causes the inverse output $\overline{Q}$ (U1B-9) to go low, effectively at the ground voltage of terminal U1B-7. Grounding terminal 9 also grounds the alternating current at the collector of the transistor Q6 in the power channel to the motor M1. Thus, after the start pulse SP is received and before framing pulses FP are received, the motor is not running. But thereafter, when the first positive framing pulse FP is inverted by a gate U3B (connected as an inverter) to a negative pulse or low at the first flip flop I input U1B-10, then the inverse output $\overline{Q}$ goes high allowing alternating current to be applied by the transistor Q6 to the power amplifier A1 which then drives the motor M1 momentarily. Transistor Q6 and flip flop I thus act as a means to gate power to the motor. During the first revolution of the motor driven helix H the reed switch S will close applying a negative recorder pulse RP to the second input of flip flop I U1B-13 and causing the flip flop I to change from its second condition with a high at its output $\overline{Q}$ back to its first, present condition with a low at the output $\overline{Q}$ and power not gated to the motor M1. Thus, as shown in FIG. 2, the flip flop II comprises a comparison circuit for sensing the deviation from coincidence of the framing pulse FP and RP.

In FIG. 2 the framing pulses FP are received at a constant frequency or repetition rate. The recorder pulses RP occur at a slower rate and are out of synchronism with the framing pulses FP by deviations d1 to d4. On receipt of each framing pulse FP flip flop I goes high turning the motor on for the duration of a power pulse PP1 to PP4 which terminates on the arrival of a recorder pulse RP. As the slow running motor causes the helix to approach synchronism with the framing pulses FP the deviations d1 to d4 become smaller and the power pulses PP1 to PP4 become longer. So that the motor runs more and more nearly continuously. When synchronism is reached, as shown by the coincident framing and recorder pulses FPS and RPS the flip flop I output terminal $\overline{Q}$ remains high continuously, the power pulses become a continuous voltage and power is supplied continuously to the motor M1 which now drives the helix H synchronously and in phase with the received framing pulses. Following the short series of framing pulses graphic signals are received and recorded properly framed on the recording paper between the helix H and blade B of the recorder.

To insure that the output $\overline{Q}$ of flip flop I remains continuously high flip flop II is provided with a further function. Flip flop II input terminal is connected by a coincidence gate U3C to the recorder pulse RP source S and the framing pulse FP source X. The negative recorder pulse is inverted to a positive going pulse by gate U3D connected as an inverter. When the positive framing pulse FP and the inverted positive recorder pulse are coincidentally applied to the input terminal 1 of flip flop II its output $\overline{Q}$ goes low and remains low so long as coincident framing and recorder pulses are applied. The flip flop II low output is continuously applied to the first input 10 of flip flop I holding flip flop I latched in the power-on condition.

Components of the circuit not described above are shown and identified conventionally by value. All capacitor values are in microfarads except when a P indicates picofarads. Connections to a positive five volt DC supply are indicated by the symbol +5. Diodes D38, D39, D40 and D41 are type 1N914. Diodes D41, D50, D51 and D52 are type 1N270.

As previously described framing consists of bringing a recorder into synchronization with the transmitted signal. Using the previously described technique, there are certain cases in which the recorder requires too much time to frame because of the system dynamics. This occurs when a motor with a relatively small torque output is used to drive a load with a large moment of inertia. The motor torque, while sufficient to bring the unit into synchronization eventually, is not sufficiently large to accomplish synchronization in a short time interval. A larger motor could be used, however it is initially more expensive, uses more space and is more costly to operate, since this peak torque loading only occurs when the drum is being accelerated rapidly during framing. The present synchronization circuit utilizes flip flop II not only to latch flip flop I in power-on condition as described above but also to vary the frequency of the alternating current power applied to the motor M1 by the power channel. For this second function the output $\overline{Q}$ (U1A-5) of flip flop II is connected through a diode D50 to terminal 12 of the frequency divider U2. As described in the second paragraph of this DESCRIPTION the initial setting of the synchronization circuit by the start pulse SP places a high at the output $\overline{Q}$ of flip flop II and the terminal 12 of the frequency divider U2 (CD4060) selecting a relatively high countdown or frequency division factor. For example, with a highly stable crystal Y2 which oscillates at 2.949120 megahertz the motor M1 may be driven after framing and during recording at 5760 hertz if the standard frequency is divided by 512, as happens when divider terminal 12 is low. But when terminal 12 is initially set high the divider is caused to divide the standard frequency by a factor of 528 rather than 512 and the resulting power frequency at divider terminal 13 is 5585.45 hertz. This lower frequency drives the motor at a lower than normal speed during framing and further shortens the framing time because the motor is running relatively more slowly than the received framing pulses and the motor and helix therefor approach synchronism faster. When synchronism is reached flip flop II not only latches flip flop I in continuous power-on condition, wherein it is non-responsive to the received starting pulses, but also changes the divider U2 so that its division factor is the normal 512 producing a motor drive frequency of 5760 hertz equal to the received framing pulse rate as is necessary to hold the recording helix in phase with the subsequently received graphic signals.

It should be understood that the present disclosure is for the purpose of illustration only and that this invention includes all modifications and equivalents which fall within the scope of the appended claims.

I claim:

1. An electronic circuit for synchronizing a facsimile recorder scanning motor with the periodic framing pulses of an incoming facsimile signal, said motor generating periodic recorder pulses proportional to the recorder speed, the circuit comprising:

a channel for supplying power to the motor;

a comparison circuit comprising a two condition data-type flip flip having an output and inputs respectively receiving the framing and recorder pulses and including means repeatedly subtracting the changing deviation time of successive pulses from the framing pulse period to produce at said output a series of control pulses of different lengths inversely proportional in duration to said deviation; and means connected in the power channel and responsive to the control pulses to transmit power non-continuously to to the motor for the duration of the control pulses;

whereby the motor speed and period of the recorder pulses are continuously adjusted faster in relation to great asynchronism of the framing and recorder pulses so that the motor speed asymptotically approaches the period of the framing pulses until the pulses are coincident and the recorder is synchronous with the incoming framing pulses.

2. A circuit according to claim 1 wherein the power channel comprises an alternating current source.

3. A circuit according to claim 1 wherein the control pulses are negatively related to the deviation from synchronism of the framing and recorder pulses.

4. A circuit according to claim 1 wherein the duration of each control pulse is proportional to the period of each framing pulse less the concommitant deviation.

5. A circuit according to claim 1 wherein the power channel includes means controlled by the comparison circuit for gating power through the channel.

6. A circuit according to claim 1 in combination with a motor, a scanning electrode driven by the motor and a recorder pulse generator actuated in synchronism with the electrode scanning.

7. A circuit according to claim 1 including a coincidence circuit receiving the framing and recorder pulses and responsive to coincident occurrence of the pulses to cause the comparison circuit to latch in a condition non-responsive to received pulses.

8. A circuit according to claim 7 in combination with a power supply including an oscillator and means to count down the frequency of the oscillator to a frequency determining motor speed wherein the coincidence circuit has an output connected to the count down means to vary the count down factor and further to vary motor speed as synchronism is approached.

9. A circuit according to claim 7 wherein the coincidence circuit includes a coincidence gate having inputs respectively receiving the framing and recorder pulses.

10. A circuit according to claim 9 wherein the coincidence circuit includes a two condition flip flop having an input connected to the coincidence gate and an output connected to one of the comparison circuit inputs for latching the comparison circuit in a power-on condition.

11. A circuit according to claim 10 wherein the comparison circuit and flip flop comprise a dual, data type flip flop.

* * * * *